United States Patent [19]

Cafaro

[11] Patent Number: 4,857,702

[45] Date of Patent: Aug. 15, 1989

[54] BATTERY POWERED ELECTRICAL CURLING IRON WITH DETACHABLE WAND AND SELF-CONTAINED BATTERY CHARGER

[75] Inventor: Michael Cafaro, Montreal, Canada

[73] Assignee: Giovanni Management Canada Ltd., Montreal, Canada

[21] Appl. No.: 127,064

[22] Filed: Dec. 1, 1987

[51] Int. Cl.[4] .......................... H05B 3/00; A45D 1/04; A45D 2/36; H01C 7/00
[52] U.S. Cl. .................................... 219/225; 219/230; 219/240; 219/533; 219/541; 320/2; 132/232
[58] Field of Search ................................ 219/222–226, 219/236–241, 533, 541; 320/2; 132/37 R, 37 A, 7, 9, 31 R, 32 R, 85, 117, 118

[56] References Cited

U.S. PATENT DOCUMENTS

| | | | |
|---|---|---|---|
| 3,859,497 | 1/1975 | McNair | 132/37 R X |
| 3,955,064 | 5/1976 | Demetrio et al. | 132/37 R |
| 4,075,458 | 2/1978 | Moyer | 219/225 |
| 4,101,757 | 7/1978 | Van Dyck et al. | 219/225 |
| 4,227,541 | 10/1980 | Satchell | 132/37 R |
| 4,228,343 | 10/1980 | Kanner et al. | 219/225 |
| 4,354,092 | 10/1982 | Manabe et al. | 219/225 |
| 4,641,010 | 2/1987 | Abura et al. | 219/222 |
| 4,647,832 | 3/1987 | Fenne | 320/2 |
| 4,697,066 | 9/1987 | Glucksman | 219/225 |

FOREIGN PATENT DOCUMENTS

| | | | |
|---|---|---|---|
| 3535831 | 4/1987 | Fed. Rep. of Germany | 219/225 |
| 1401882 | 4/1965 | France | 219/225 |
| 1553082 | 12/1968 | France | 219/225 |
| 2021943 | 12/1979 | United Kingdom | 219/222 |
| 2167953 | 6/1986 | United Kingdom | 219/225 |

Primary Examiner—Anthony Bartis
Attorney, Agent, or Firm—Fishman, Dionne & Cantor

[57] ABSTRACT

A battery powered electric curling brush/iron includes an elongated cylindrical electrically heated wand detachably connected to the end of a hollow handle by a pair of separable electrical connector terminals. The handle houses rechargeable batteries for supplying electrical power to the wand through the connector terminals and a charging circuit for recharging the batteries from an external AC household source through a connector plug movable from a retracted position in the handle to an extended position projecting through an opening in a wall thereof. The opening is closed by a slidable cover having a closed position wherein the opening is covered, the batteries are disconnected from the wand and the plug is retracted; a partially open position wherein the cover operates a switch to connect the wand to the batteries and the plug is retracted; and an open position wherein the wand is again disconnected from the batteries and the plug may be manually moved to its extended position to allow recharging of the batteries through the charging circuit.

The wand is heated by a metal foil resistance heating element electrically insulated by layers of Kapton film.

4 Claims, 4 Drawing Sheets

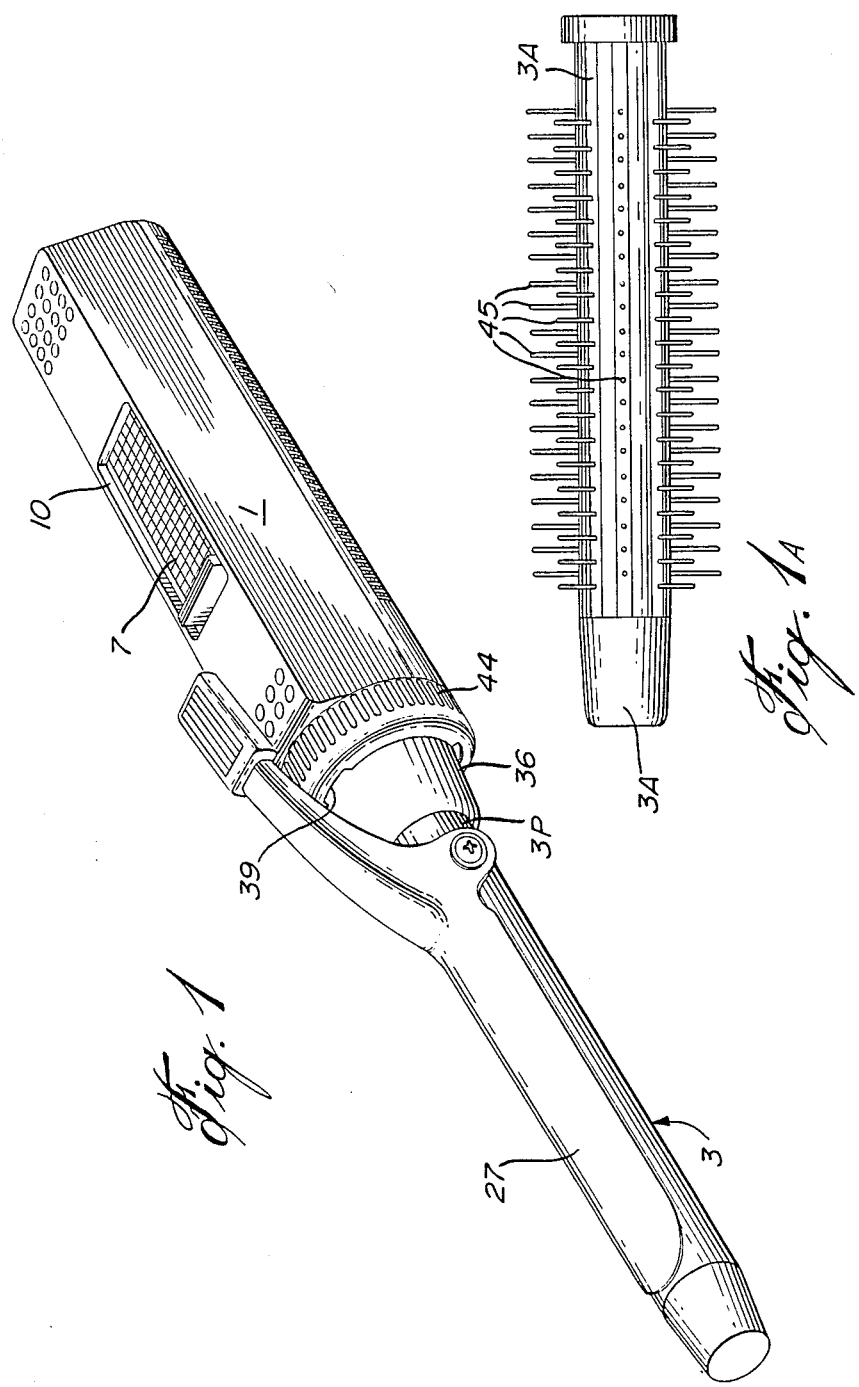

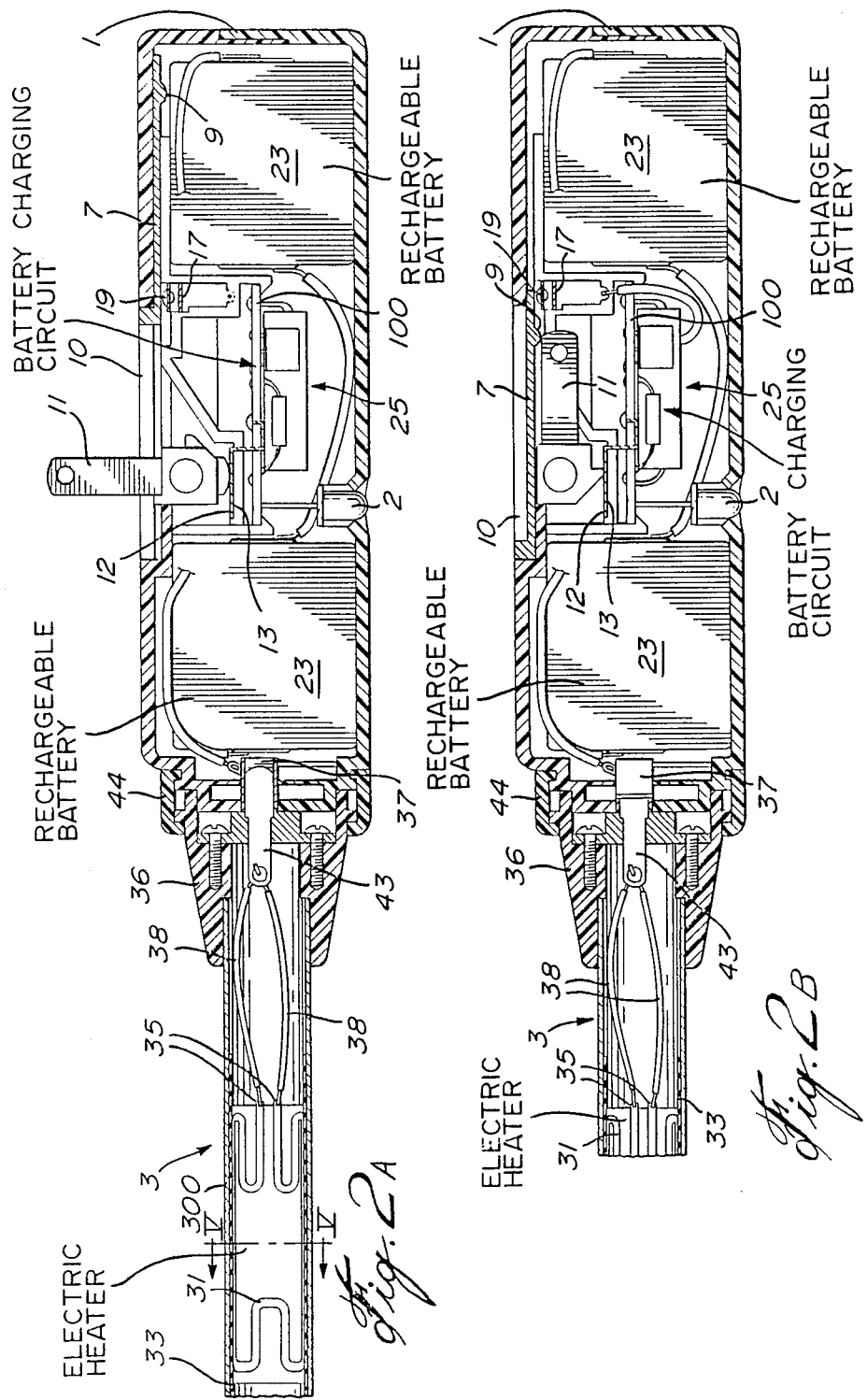

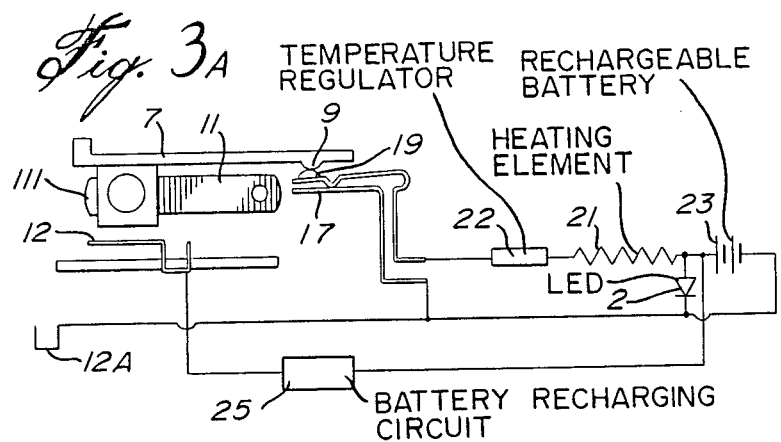
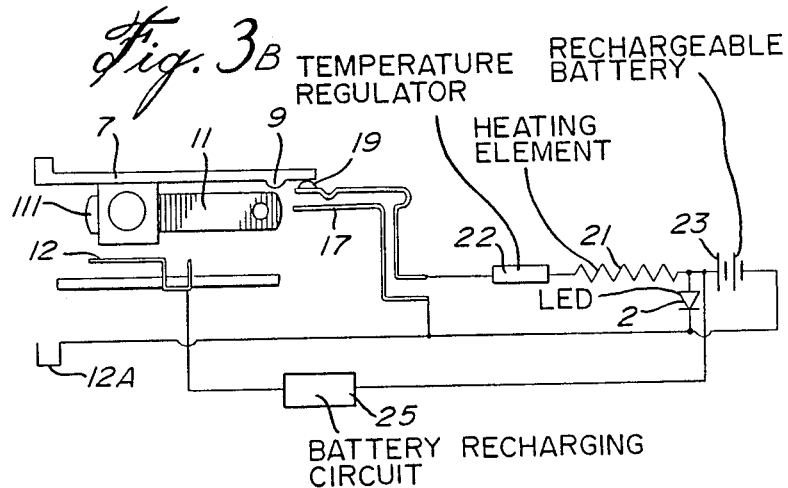
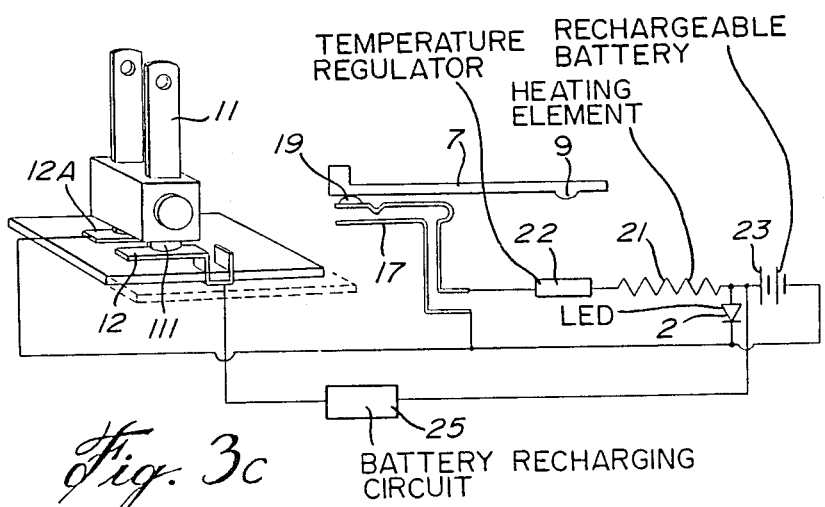

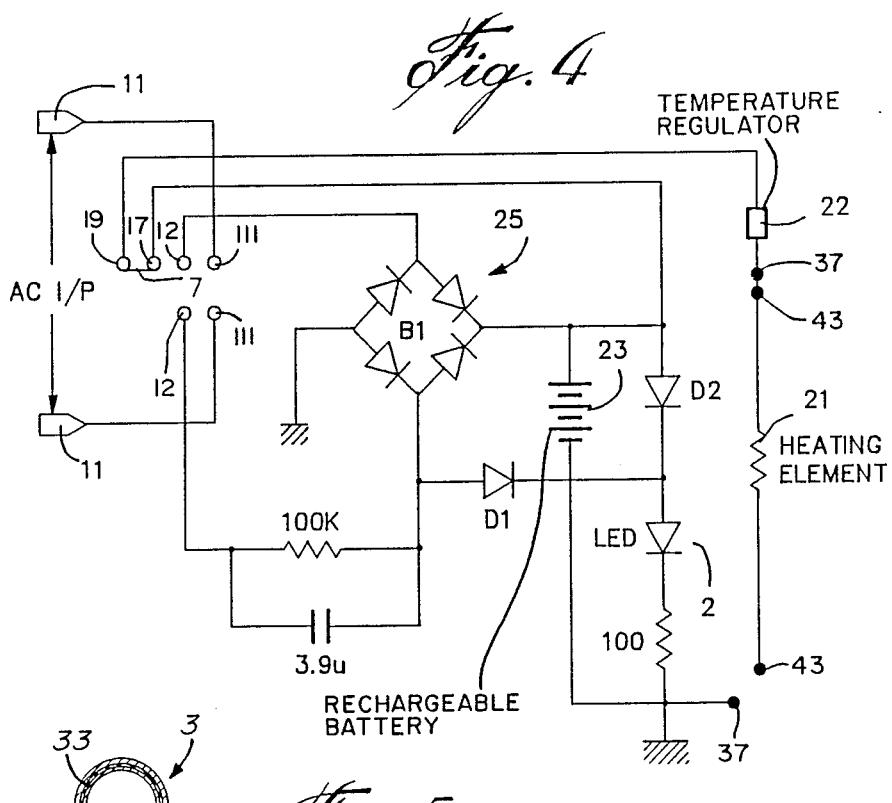
Fig. 4
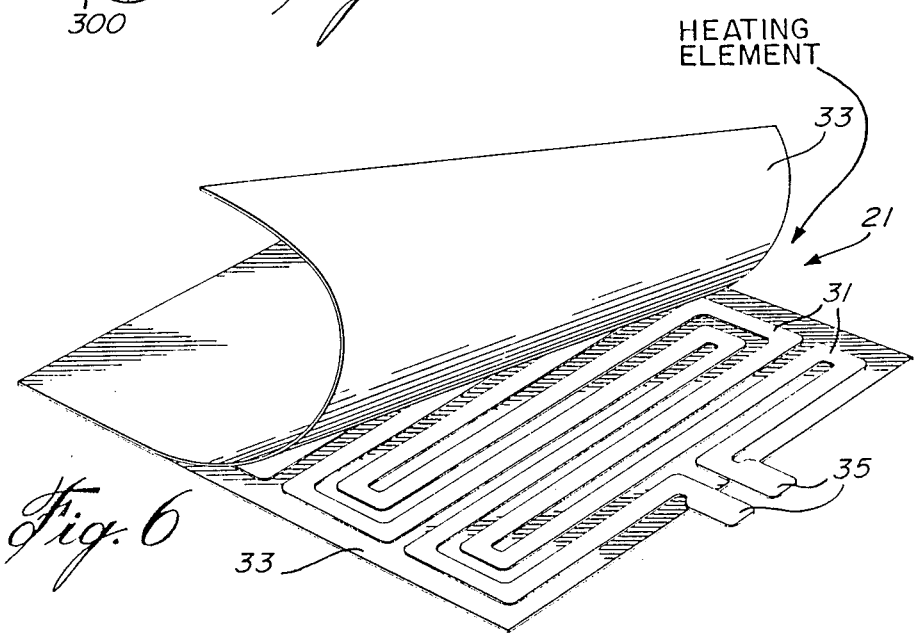
Fig. 5
Fig. 6

BATTERY POWERED ELECTRICAL CURLING IRON WITH DETACHABLE WAND AND SELF-CONTAINED BATTERY CHARGER

BACKGROUND OF INVENTION

1. Field of the Invention

The invention relates to a battery powered electrical curling/brush iron having a battery recharging circuit.

2. Description of Prior Art

Electrical curling irons are known in the art. Curling irons which are not battery operated are shown in, for example, U.S. Pat. Nos. 4,228,343, Kanner et al, Oct. 14, 1980; 4,075,458, Moyer, Feb. 21, 1978; 4,101,757, Van Dyck et al, July 18, 1978. With such curling irons, the heating element is typically preheated by plugging into household AC current. If the element is not preheated enough, it will grow cold before the curling process is completed and will have to be reheated which is, of course, inconvenient. In any case, there is at least a waiting period, while the iron is being preheated, before it can be used.

In addition, in the selected references, heat is applied directly to the wand which could be dangerous if the heated wand is grasped.

All of the above patented devices include plugs stored in the handle and removable from the handle to plug into wall sockets for preheating the heating elements.

U.S. Pat. No. 4,641,010, Abura et al, Feb. 3, 1987 and U.S. Pat. No. 4,354,092, Manabe et al, Oct. 12, 1982, describe examples of battery powered curling irons with facilities for recharging the batteries.

In the '010 patent, the heating element is on the outside of the wand and is therefore in direct contact with the hair of the person using the curling iron, or with any hand which, accidentally or otherwise, grasps the wand. Needless to say, this could also prove to be needlessly dangerous.

SUMMARY OF INVENTION

It is therefore an object of the invention to provide an electrical hair curler which overcomes the above disadvantages.

More specifically, it is an object of the invention to provide an electric hair curler which incorporates within it unique safety features.

In accordance with the invention there is provided a battery powdered electrical curling/brush iron comprising a wand comprising a first hollow longitudinally extending cylindrical member and including an electrically insulatingly covered heating element extending into the cylindrical member and having input terminals at one end of the cylindrical member. A handle, which comprises a second hollow longitudinally extending cylindrical housing member, includes a space within the housing for receiving at least one battery for providing electrical power. Output terminals are provied at one end of the second cylindrical member and switch means for connecting the battery to the output terminal are included on the handle. The one end of the wand is removably connected to one end of the handle such that, when the wand is connected to the handle, the input terminals are in contact with the output terminals, whereby, electrical heating power is provided to the heating element from the battery through the switch means.

BRIEF DESCRIPTION OF DRAWINGS

The invention will be better understood by an examination of the following description, together with the accompanying drawings, in which:

FIG. 1 is a top view of the inventive hair curler;

FIG. 1A illustrates an alternative wand for use with the hair curler of FIG. 1;

FIGS. 2A and 2B are side views of the inventive hair curler partly in section showing the plug in recharging and stowed positions respectively;

FIGS. 3A, 3B and 3C illustrate schematically three different positions of the sliding plate switch and plug;

FIG. 4 is a schematic diagram of the heating and recharging electrical circuits of the curler;

FIG. 5 is a section through V—V of FIG. 2A to illustrate the position and form of the heating element;

FIG. 6 illustrates the heating element in its unrolled condition;

DESCRIPTION OF PREFERRED EMBODIMENTS

Figure 8:
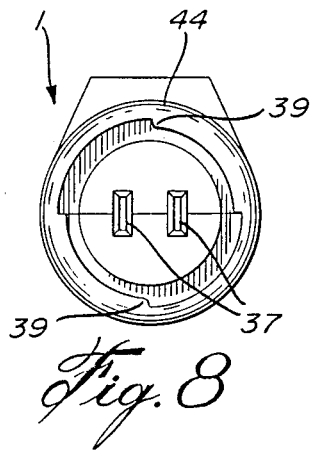
FIG. 8 illustrates the receptacle end of the handle.

Referring to the drawings, the curler includes a handle 1, which comprises a hollow cylindrical member. An LED 2 (See also FIGS. 2A and 2B) is disposed on the base of the handle for purposes to be described below. The curler also includes a wand 3, which is also a hollow cylindrical member, and which can be plugged into handle 1 or unplugged therefrom as discussed below. This wand comes in two (2) different styles as seen at 3 and 3A in FIG. 1 and FIG. 1A:

(1) Hollow cylindrical member 3 with a clamp 27 in FIG. 1, and (2) Hollow cylindrical member 3A with plastic nylon teeth 45 in FIG. 1A. Each hollow cylindrical member can be made in three (3) different diameter sizes $\frac{3}{4}''$, $\frac{5}{8}''$, $\frac{1}{2}''$.

Disposed on the handle 1 is a switch 5 including a sliding plate 7. As seen in FIG. 2A, the sliding plate 7 includes a downwardly extending protrusion 9 and the plate will either cover or uncover the opening 10 in the handle 1.

A plug 11, which can occupy either a recharging position, as shown in FIG. 2A, or an operating (or stowed) position, as shown in FIG. 2B, is disposed within a space in the hollow handle 1 so as to underlie the opening 10. The plug is mounted on a support 13 and can be pulled out to its recharging position. When sliding plate 7 is moved to the right to uncover opening 10 (as shown in FIG. 2A), plug 11 can be pulled out through the opening 10 and can be plugged into a wall socket. It is noted that the plug is disposed about the center of gravity of the curler so that the curler is balanced about the plug.

When plate 7 is moved to the left to cover the opening 10, as shown in FIG. 2B, it forces the plug to assume its inoperative position.

As seen in FIGS. 2A and 2B and FIG. 5, the space between the heating element 21 and the jacket 300 of the wand 3 is filled with a refractory material 301 to better conduct heat from the heating element 21 to the jacket 300.

Turning now to FIGS. 3A, 3B and 3C, underlying the sliding plate 7 is a fixed contact member 17 and an adjacent flexible contact member 19. As can be seen, the contact members 17 and 19 are connected to heating element 21 and battery 23 in series arrangement. The battery 23 is contained in a space in the handle as seen in FIGS. 2A and 2B, and the heating element is disposed in the wand as will be discussed below.

With plate 7 in its intermediate position (FIG. 3A), protrusion 9 of plate 7 abuts flexible contact member 19 to force it into contact with fixed contact member 17 so that the heating circuit is completed and current from the battery 23 flows through the heating element 21 to cause it to heat up. Preferably, a temperature regulator 22 is included in the circuit with the heating element 21 to stop the current flow when the heating element reaches a predetermined temperature and to permit current flow to resume after the heating element cools off to a second predetermined temperature.

When plate 7 is in its extreme left-hand position (FIG. 3B) or extreme right-hand position (FIG. 3C), protrusion 9 no longer abuts flexible contact member 19 so that flexible contact member 19 is no longer in contact with fixed contact member 17. Accordingly, the heating circuit is no longer complete and heating power is not applied to the heating element.

When plate 7 is in its extreme left-hand position, or intermediate position, (FIGS. 3B and 3A respectively) it overlies plug 11 so that plug 11 is in its operating position within the handle and cannot be plugged into a wall socket. Only when plate 7 is in the extreme right-hand position (FIG. 3C) is opening 10 uncovered, and only then will the plug extend out of the handle through the opening 10 in its recharging position. At that time, the plug can be plugged into a household wall socket.

As can be seen, contacts 12 and 12A of plug 11 are connected to the recharging circuit 25 which is connected, in recharging arrangement, to battery 23. With plug 11 in its recharging position, it can, as above-mentioned, be plugged into a wall socket, whereupon power will be supplied to the recharging circuit to recharge the battery.

It is noted that with the inventive arrangement, the battery cannot be charged while the heating element is being heated, and the heating element cannot be heated while the battery is being recharged. Thus, the heating element is completely isolated from the AC recharging power. This is also illustrated in FIG. 4.

As seen in FIG. 4, the charging circuit comprises a four-diode rectifier. The LED 2, as will be seen, is in circuit when the battery is being recharged or when the heater is being heated. All of the circuitry of FIG. 4 is housed in handle 1.

In FIG. 4, when 7 connects 17 to 19 the slider is in its intermediate position. In view of the action of the circuit in this position, it is referred to as the ON position.

When 7 does not connect 17 to 19, and 12 and 12A are not connected to 111, the slider is in its extreme left-hand position. In view of the action of the circuit in this position, it is referred to as the OFF position.

When 7 does not connect 17 to 19, but 12 and 12A are connected to 111, the slider being in its extreme right-hand position. In view of the action of the circuit in this position, it is referred to as the RECHARGE position.

In the ON position, both the heating element 21 and the LED 2 are connected to the battery. In the RECHARGE position, both the battery 23 and LED 2 are connected to AC power. Thus, LED 2 ON indicates either recharging or operating.

In the OFF position, the battery 23 is disconnected both from the heating element 21 and AC power, and LED 2 is disconnected both from the battery 23 and AC power. Thus, LED OFF indicates no recharging or operating.

It is the provision of the intermediate (OFF) position that permits isolation of the heating element 21 from AC power without the requirement for two separately operating circuits.

Turning now to FIGS. 2A, 2B and 5, the heating element 21 comprises a rolled-up member which extends longitudinally along the length of the wand 3 and which is enclosed by the wand. Only a single layer of rolled-up member is shown in FIG. 5 for the sake of clarity, but the rolled up member may comprise several layers.

It is noted that in FIGS. 2A and 2B, 21 is not in section. Although FIGS. 2A, 2B and 5 illustrate 21 as being spaced from the wall 301 of wand 3, this was for the sake of clarity only. The heating element 21 will normally abut the wall 301 of wand 3.

The heating element is preferably formed from a Kapton TM film as shown in FIG. 6. As seen in FIG. 6, the heating element comprises two side-by-side undulating metal foil strands 31 covered by at least one, but preferably two, insulating Kapton film layers 33. The Kapton film is rolled up to form the rolled-up member. The metal foil strands includes input terminals 35 at one end thereof. As seen in FIGS. 2A and 2B, terminals 35 are connected to contacts 43 by leads 38.

Figure 7:
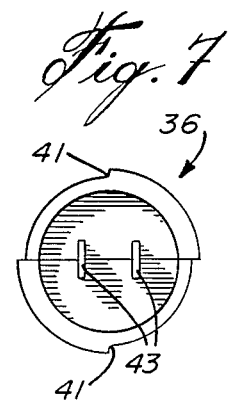
FIG. 7 illustrates the plug-in end of the wand.

As seen in FIG. 7, the plug-in end of the wand comprises contacts 43 which are connected to respective ones of the terminals 35 of FIG. 6. The plug-in end of the wand 3 also includes alignment tabs 41.

The end of the handle includes a receptacle to receive the plug-in end of the wand. As seen in FIG. 8, the receptacle includes alignment channels 39 and contacts 37. When the wand is plugged into the handle, channels 39 guide tabs 41 so that, when fully plugged in, a respective one of contacts 37 is in physical and electrical contact with a respective one of contacts 43. Then 44 (see also FIG. 1) is turned to lock and secure contacts. This connects the heating circuit to the heating element as shown schematically in FIG. 4.

The use of an insulating covering on the heating element isolates the wand from the raw heat of the heating element and it also provides electrical insulation between the heating element and the wand to provide further safety features.

The rechargeable nickel cadmium batteries are a ½D Cell and all specifications are listed below: (See FIG. 9)

| FEATURES | |
|---|---|
| Long Life | |
| High-Rate Discharge | |
| Resealable Safety Vent | |
| Mount In Any Position | |
| Overcharge Capability | |
| No Maintenance | |
| Flat Discharge Voltage Profile | |
| SPECIFICATIONS | |
| Voltage | |
| † Rated volts d-c | 1.2 |
| Capacity (Ah) at 25° C. to 0.9 V | |
| † Rated minimum at 2.2 A (C) Rate | 2.2 |
| Expected minimum at 440 mA (C/5) Rate | 2.4 |
| Charge Rate (mA) at 25° C. | |
| † Maximum rate in overcharge | 220 |

-continued

| | |
|---|---|
| Minimum charge rate | 110 |
| *Max. Discharge (A) at 25° C. | |
| Continuous | 58 |
| Momentary (1 second) | 116 |
| **Cell Temperature Limits (°C.) | |
| Storage | −40° to +50° |
| Cell under discharge | −20° to +50° |
| Cell under charge at 220 mA | +5° to +50° |
| Effective Internal Resistance | |
| RE (milliohms) | |
| † Rated maximum | 12 |
| Typical | 10 |
| Weight | |
| Typical (ounces) | 3.2 |
| (grams) | 90.7 |
| TYPICAL APPLICATIONS | |
| Electronic Instruments | |
| Photographic Equipment | |
| Military Equipment | |
| Emergency Lighting | |
| Portable Lighting | |
| Computer Standby Power | |
| Communication Equipment | |

| | MAXIMUM DIMENSIONS | | | |
|---|---|---|---|---|
| | BARE CELL | | SLEEVE & TAB | |
| Dimensions | Inches | mm | Inches | mm |
| D | 1.272 | 32.31 | 1.33 | 33.8 |
| H | 1.410 | 35.81 | 1.45 | 36.8 |

The wand includes a clamp member 27 or plastic teeth 45 as shown in FIGS. 1 and 1A.

Although a single embodiment has been above described, this was for the purpose of illustrating, but not limiting, the invention. Various modifications, which will come readily to the mind of one skilled in the art, are within the scope of the invention as defined in the appended claims.

I claim:

1. A battery powered electrical curling/brush iron, comprising:
   A. a wand comprising a first hollow longitudinally extending cylindrical member, and including:
      i. an electrically insulatingly covered heating element extending into said cylindrical member and having a pair of input terminals at one end of said cylindrical member;
   B. a handle comprising a second hollow longitudinally extending housing member, and including:
      i. a space within said housing receiving a rechargeable battery for providing electrical power;
      ii. a pair of output terminals at one end of said second housing member;
      iii. an opening through a surface of said second housing member;
      iv. a plug means disposed in said housing in registry with said opening and movably mounted in said housing to occupy a first, retracted position in said housing and a second, extended, position projecting through said opening;
      v. a cover member slidably mounted over said opening to occupy one of three predetermined positions:
         a. a first position of said cover member wherein said cover member completely covers said opening;
         b. a second position of said cover member wherein said cover member partially covers said opening; and
         c. a third position of said cover member wherein said opening is substantially completely uncovered by said cover member;
      said plug means being in said retracted position thereof in said first and second positions of said cover member, and said plug means being movable to said extended position and extending through said opening in said third position of said cover member;
      said plug means having a first tine and a second tine and being insertable directly into an A.C. household source of power;
         d. said sliding cover including a protrusion extending downwardly at one end thereof;
      vi. a fixed contact member mounted in said housing;
      vii. a movable contact member mounted in alignment with said fixed contact member;
      said protrusion moving said movable contact member to abut said fixed contact member in response to movement of said cover member to said second position thereof;
      said fixed contact member and said movable contact member being disconnected from each other in the other positions of said cover member;
      viii. a circuit arrangement in said housing, comprising:
         a. a rectifier bridge comprising:
            1. a first diode having an anode and a cathode;
            2. a second diode having an anode and a cathode;
            3. a third diode having an anode and a cathode;
            4. a fourth diode having an anode and a cathode;
            5. said cathode of said first diode being connected to said anode of said second diode at a first junction;
            6. said cathode of said second diode being connected to said cathode of said third diode at a second junction;
            7. said anode of said third diode being connected to said cathode of said fourth diode at a third junction;
            8. said anode of said fourth diode being connected to said anode of said first diode at a fourth junction;
            9. said first junction being connected to a first power terminal in said housing;
            10. said third junction being connected to a second power terminal in said housing through a parallel resistor capacitor combination;
            11. first means on said plug means electrically connecting said first tine of said plug means to said first power terminal when said plug is moved to said extended position;
            12. second means on said plug means electrically connecting said second tine of said plug means to said second power terminal when said plug is moved to said extended position;
      whereby, when said plug means is in said extended position and is inserted into an A.C. household source of power, said A.C. household source of power is connected across said first and third junctions of said rectifier bridge;

13. said fourth junction being connected to ground;
14. said second junction being connected to the positive terminal of said rechargeable battery, the negative terminal of said rechargeable battery being connected to ground;
b. a fifth diode having an anode and a cathode, the anode of the fifth diode being connected to said second junction, the cathode of said fifth diode being connected to a fifth junction;
c. a sixth diode having an anode and a cathode, the anode of said sixth diode being connected to said third junction, the cathode of said sixth diode being connected to said fifth junction;
d. an LED diode having an anode and a cathode, the anode of the LED diode being connected to said fifth junction, the cathode of said LED diode being connected to ground;
e. said heating element having one end connected to one of said input terminals and the other end connected to the other one of said pair of input terminals;
f. said pair of input terminals being connected to respective ones of said pair of output terminals;
g. one of said pair of output terminals being connected to ground;
h. the other one of said pair of output terminals being connected to said movable contact member;
i. said fixed contact member being connected to said second junction;
C. said one end of said first cylindrical member being removably connected to said one end of said second cylindrical housing member such that, when said first cylindrical member is connected to said second cylindrical housing member, said pair of input terminals are in contact with said pair of output terminals;
whereby, when said cover member is in said second position, said rechargeable battery is connected to said heating element whereby to provide power to heat said heating element; and
when said cover member is in said third position and said plug means is extended outwardly through said opening for insertion into an A.C. household source of power, A.C. power is applied to said battery through said circuit means to recharge said rechargeable battery.

2. A curling/brush iron as defined in claim 1 wherein said plug means is disposed substantially centrally of the length of said hollow housing member.

3. A curling/brush iron as defined in claim 1 wherein said heating element comprises a conductive means covered on both surfaces thereof by an insulator comprising a Kapton film;
said heating element being rolled up and disposed in said wand and extending longitudinally of said wand and being enclosed by said wand.

4. A curling/brush iron as defined in claim 3 wherein said conductive means comprises two side-by-side metallic foil elements.

* * * * *